June 10, 1969  R. L. McGUIRE  3,448,821

TRACTOR CONTROL STRUCTURE

Filed March 6, 1968

INVENTOR:
ROBERT L. McGUIRE

*Arthur J. Hansmann*
ATTORNEY

United States Patent Office 3,448,821
Patented June 10, 1969

3,448,821
TRACTOR CONTROL STRUCTURE
Robert L. McGuire, Burlington, Iowa, assignor to
J. I. Case Company, Racine, Wis., a corporation of
Wisconsin
Filed Mar. 6, 1968, Ser. No. 710,841
Int. Cl. B60k *37/00*
U.S. Cl. 180—90                                    6 Claims

ABSTRACT OF THE DISCLOSURE

A tractor control structure having a pivotal control box with controls thereon and mounted on the floor of the tractor adjacent the operator's seat for tilting toward and away from the seat. A cowl is mounted on the floor for receiving the control box in the stowed position of the box. Latch means are operative on the box for releasably holding the box in either the stowed position or operating positions where the controls are accessible and convenient for the operator sitting in the operator's seat. Also, foot pedals are adjacent the control box on each side thereof, and the entire structure permits the operator to manipulate the foot pedals and also the hand controls, all while occupying the seat.

Background of the invention

This invention relates to a tractor control structure. More particularly, this invention relates to tractor controls where both hand operated controls and foot operated controls are commonly used. Thus the operator would occupy the operator's seat, and he would manipulate the hand and foot controls for running the tractor, either to propel the tractor or to operate its attached implements. In the tractor arrangement, it is of concern to have the controls in a position where they are accurately manipulable by the operator so that he can operate the tractor with a maximum degree of accuracy, comfort, and safety. This all requires that the controls be easily accessible, and that the operator can see the controls and also see the instruments which indicate the operation of the tractor.

Further, it is of concern to provide the tractor with adequate space so that the operator can move into the tractor and onto and off of the operator's seat. To do this, maximum space can be provided by having the controls movable toward and away from the operator's seat so that when the operator is walking in the tractor, he has maximum space, but also when he is seated in the tractor, then he has the controls easily and readily accessible to him.

Still further, it must be recognized that different desires of operators, and different sizes of operators, both require that the controls be positionable in selective positions for the different operators. Thus, to have the controls movable between a stowed position and between selective operating positions, is an object accomplished by this particular invention.

Still another concern with the controls of tractors, and this includes crawler tractors, wheel tractors, and it also includes other types of construction equipment, is the concern of having the controls available in a convenient position for either the standing or seated positions of the operator. That is, the controls should be high enough so that the operator can easily reach them if he is standing, and they should also be easily accessible to the operator's reach when he is in a seated position.

The present invention recognizes the concerns and problems mentioned above, and it provides a solution to these problems by the provision of a structure which overcomes the problems mentioned, and it does so with an economical, sturdy, and easily operable structure which accommodates the different conditions mentioned above, but all being accomplished in a single unitary structure.

Detailed description of the drawings

Figure 1:
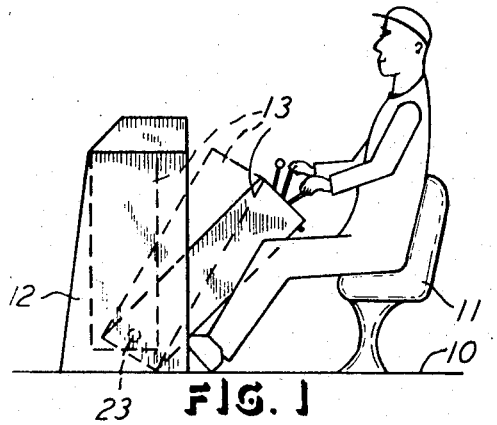
FIG. 1 is a side elevational view of an embodiment of this invention, and showing a fragment of a tractor in which the embodiment is located.

FIG. 1 shows a fragment of a tractor or vehicle, by showing the tractor or vehicle floor 10 having an operator's seat 11 mounted thereon for supporting the operator shown. A cowl 12 is also mounted on the floor 10 in a fixed position, and it receives a pivotal control box 13. Thus, the control box 13 is shown pivoted downwardly to an operating position, in full lines in FIG. 1, and it is also shown in dotted lines in a second operating position which would be slightly further away from the operator's station or seat 11 and more upright, as shown. Finally, the box 13 is also indicated by the dotted lines shown within the cowl 12, and this position would be the stowed position of the box 13.

Figure 2:
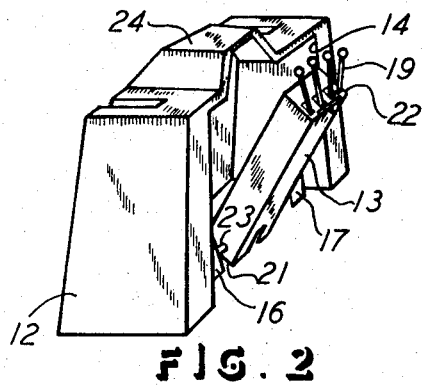
FIG. 2 is a side perspective view of FIG. 1, but with the tractor removed.

Thus FIG. 2 shows the box 13 to be pivoted or tilted into an operating position, and it also shows the cowl 12 to have an opening 14, on one side of the cowl, for the pivoting of the box 13 between the stowed position and the operating positions. FIG. 2 also shows a foot pedal 16 and a foot pedal 17, both of which would be suitably movably mounted on the floor 10 for simultaneous manipulation by the feet of the operator occupying the seat 11. Therefore, FIG. 1 shows that the box 13 is pivotal to a position to where it can be disposed between the legs of the operator while the operator has his feet on the pedals 16 and 17. Pedal 16 may be the vehicle brake pedal, and pedal 17 may be the vehicle accelerator pedal. To permit pedal operation, straddling of the box 13, and accessibility of controls 19 on the box 13, the height of the box, from its bottom 21 to its top 22, is substantially greater than the width of the box between the foot pedals 16 and 17. Thus the operator can sit with one leg or knee on each side of the box 13 as indicated in FIG. 1, and he then has the hand controls 19 in a convenient position for manipulation.

Of course it will be understood that the controls 19 are of the lever operable type, and it would therefore be suitably and conventionally pivotally mounted on the box 13 and extend thereabove, as shown. The interior of the box 13 would therefore contain suitable and conventional connectors extending to apparatus (not shown) which would control the action of the vehicle, all in any conventional manner well known in the art. Therefore, the box 13 can be placed in either of the two shown operating positions in FIG. 1, and in both positions the controls 19 will be effective.

For the pivotal mounting of the box 13, the pivot shaft 23 is shown to extend laterally through the box 13, and the shaft extends into the cowl 12 to provide the fixed pivot mounting desired.

The cowl 12 in FIGS. 1 and 2 shows the cowl top 24 to be solid and thus it completely covers the box 13 and its controls 19 when the box 13 is in the stowed position.

Figure 3:
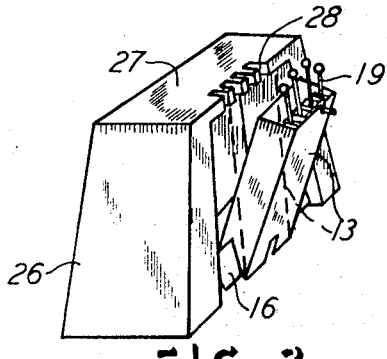
FIG. 3 is a side perspective view similar to FIG. 2, but showing a modification thereof.

However, FIG. 3 shows a cowl 26, which would also be mounted on a tractor floor 10, and here the top 27 of the cowl is shown to have openings 28 which are aligned with the several controls 19 in the pivotal direction of the box 13. Thus, when the box 13 is in the stowed position indicated by the dotted lines in FIG. 3, then the controls 19 extend above the cowl top 27 and are available for manipulation, even though the box 13 is in the stowed position. That is, the operator might desire to stand on the floor 10 and manipulate the controls 19, and it is then preferred that the box 13 be in the upright position, indicated by the dotted lines in FIG. 3.

Figure 4:
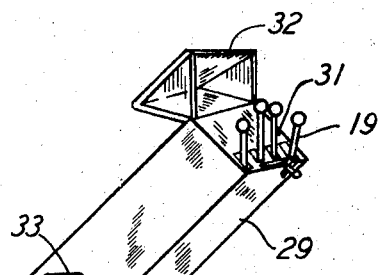
FIG. 4 is a side perspective view of another embodiment of this invention.

FIG. 4 shows still another arrangement, and here a box 29 has the controls 19 extending above its top surface 31, but a cover 32 is affixed to the box 29. Thus the cover 32 can be pivotal on the box 29, to the open position shown in FIG. 4, and it can also pivot to a closed position where it will extend over the top 31 and conceal the controls 19. In that arrangement, the cowl need not be utilized, and a pivot shaft 33 provides the pivotal mounting for the box 29 by extending therethrough, and the shaft 33 would of course be suitably affixed to the floor 10.

Figure 5:
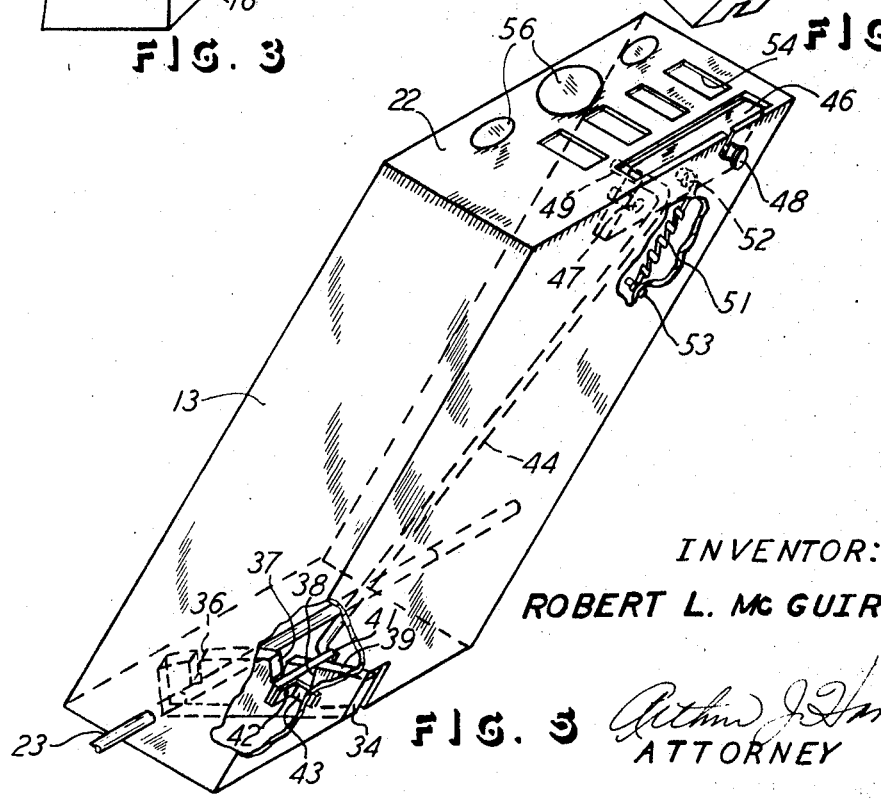
FIG. 5 is an enlarged side perspective view of a portion of FIG. 1, with parts broken away, and with parts removed.

FIG. 5 shows the pivotal mounting of the box 13 by the shaft 23 which extends transverse to the fore-and-aft direction of the operator's seat 11 so that the box 13 is pivoted or tilted toward and away from the seat or station 11. The drawing also shows the latching or locking means for securing the box 13 in either the stowed or the two operating positions described. A quadrant 34 is disposed in a fixed position, and it may be mounted on the floor 10 to be so disposed. It is provided with three notches 36, 37, and 38 spaced along the top edge 39 of the member or quadrant 34 and being unevenly spaced therealong, as shown. A latch 41 is receivable in all of the three notches, and it is pivoted about a pivot member 42 supported on a bracket 43 affixed to the box 13. Thus the latch 41 can move up and down for withdrawal and insertion with respect to any one of the three notches, as selected by the operator. The latch 41 is pivotally controlled by means of a rod 44 extending inside the box 13 and to a lever 46 pivotally mounted on the box by means of a pivot pin 47 affixed to the box 13. Thus the lever 46 can move up and down, and a spring-loaded plunger button 48 gives the operator control of the lever 46 since he can grasp the button 48 and swing the lever 46 up and down. The upper end of the rod 44 extends through the lever 46 in the rod end 49, so the rod 44 is therefore displaced up and down by means of pivoting the lever 46, and this action sets the latch 41 with respect to the quadrant 34.

A tension spring 51 is connected at its upper end 52 to the lever 46, and it is also mounted on the box 13 at the lower end 53 of the spring 51. Thus the lever 46 is urged downwardly by the spring 51, so any time that the operator releases the control knob or button 48, the latch 41 will seek a position in one of the three notches, when the box 13 is pivoted to a position corresponding to the latching.

FIG. 5 also shows that the top 22 of the box 13 has openings 54 through which the controls 19 extend. Also, instruments 56, which may be meters for the vehicle, are mounted on the box top 22, so the operator can readily read them when he is seated and the box is tipped forward.

Of course the quadrant notch 38 represents the maximum tilted operating position of the box 13, as shown in solid lines in FIG. 1. Notch 37 represents the other operating position of the box 13, as shown in dotted lines in FIG. 1. Notch 36 represents the stowed or vertical position of the box 13, inside the cowl 12.

What is claimed is:

1. In a tractor control structure including a tractor floor, a control box movably attached with respect to said floor and extending thereabove, a cluster of controls extending from said control box and thereabove for selective manual manipulation by an operator with respect to said control box and being arranged with said control box for unitary movement therewith, the improvement comprising an operator's seat attached to said floor to be faced with respect to a fore-and-aft axis and positioned adjacent said movable control box, pivotal mounting means at the lower end of said control box connecting said control box to said floor and having the axis of pivot extending transverse to the fore-and-aft axis of said operator's seat for pivoting the upper portion of said control box toward and away from said seat, and releasable latching means interconnected between said floor and said control box and including a plurality of latching positions disposed in the plane of pivot of said control box for releasably securing said control box in selected pivoted positions of positioning said controls with respect to an operator seated in said operator's seat.

2. The subject matter of claim 1, wherein said latch means includes a latch movably attached to said control box, and a latch securing member mounted on said floor and engagable with said latch and said latch securing member having said plurality of latching positions thereon.

3. The subject matter of claim 2, including a cowl mounted on said floor and surrounding said control box on all sides except the one side facing said operator's seat, said control box being pivotal out of and into said cowl through said one side for pivoting between operating and stowed positions with respect to said cowl.

4. The subject matter of claim 3, wherein said latch securing member includes a notched quadrant on said floor and said plurality of latching positions being notches in said quadrant and in the plane of pivot and corresponding to said operating and stowed positions, and said latch includes a latch structure movably mounted on said control box and being receivable in said notches in positions corresponding to said operating and stowed positions of said control box.

5. The subject matter of claim 4, wherein there are three of said notches for receiving said latch in a total of one stowed position and two tilted operating positions of said control box, and a spring connected to said latch for urging the latter into a selected one of said notches.

6. The subject matter of claim 1 said tractor control structure further including foot pedals mounted on said floor to the opposite sides of said control box laterally of the plane of pivot of said control box, said control box being of a height above said floor greater than the width of said control box between said pedals and thereby have said control box sufficiently narrow to accommodate the operator to sit in said operator's seat and simultaneously place his feet on said foot pedals and also simultaneously have said control box pivoted to an operating position between the legs of the operator and have said cluster of controls within reach of the seated operator.

References Cited
UNITED STATES PATENTS

| | | | |
|---|---|---|---|
| 1,445,181 | 2/1923 | Sizaire | 180—90 |
| 2,091,059 | 8/1937 | Tjaarda | 180—90 |
| 2,304,375 | 12/1942 | Peterson et al. | |
| 2,876,857 | 3/1959 | Beyerstedt | 180—90 |

A. HARRY LEVY, *Primary Examiner.*